(12) United States Patent
Calago et al.

(10) Patent No.: US 11,041,526 B1
(45) Date of Patent: Jun. 22, 2021

(54) ADJUSTABLE WEAR PAD

(71) Applicants: ZOOMLION Heavy Industry NA, Inc., Yorkville, WI (US); ZOOMLION Heavy Industry Science and Technology Co. Ltd., Changsha Hunan Province (CN)

(72) Inventors: Edgar Calago, Lake Villa, IL (US); Erik Goslawski, Burlington, WI (US)

(73) Assignees: Zoomlion Heavy Industry NA, Inc, Yorkville, WI (US); Zoomlion Heavy Industry Science and Technology Co. Ltd, Changsha Hunan Province (CN)

( * ) Notice: Subject to any disclaimer, the term of this patent is extended or adjusted under 35 U.S.C. 154(b) by 0 days.

(21) Appl. No.: 16/938,926

(22) Filed: Jul. 25, 2020

(51) Int. Cl.
*F16C 29/02* (2006.01)
*F16C 29/00* (2006.01)
*F16C 33/04* (2006.01)
*F16C 29/12* (2006.01)
*B66C 23/70* (2006.01)

(52) U.S. Cl.
CPC ............ *F16C 29/001* (2013.01); *F16C 29/02* (2013.01); *F16C 29/126* (2013.01); *F16C 33/04* (2013.01); *B66C 23/707* (2013.01)

(58) Field of Classification Search
CPC ........ F16C 25/02; F16C 29/001; F16C 29/02; F16C 29/126; F16C 33/04; F16C 33/08; B66C 23/707
See application file for complete search history.

(56) References Cited

U.S. PATENT DOCUMENTS

| | | | | |
|---|---|---|---|---|
| 4,004,695 A | * | 1/1977 | Hockensmith | ........ B66C 23/701 |
| | | | | 212/350 |
| 5,388,342 A | * | 2/1995 | Garau | ..................... F16C 29/02 |
| | | | | 33/1 M |
| 9,950,911 B2 | | 4/2018 | Fortunato et al. | |

FOREIGN PATENT DOCUMENTS

DE 29715843 * 9/1997

* cited by examiner

*Primary Examiner* — James Pilkington
(74) *Attorney, Agent, or Firm* — Donald J. Ersler

(57) ABSTRACT

An adjustable wear pad with a wear indicator preferably includes a wear pad, a push plate, at least two pushing fasteners, at least two retention fasteners and at least two threaded inserts. The at least two threaded inserts are retained in the wear pad. Each threaded insert threadably receives one of the retention fasteners. The push plate preferably includes a plate member, a hook extension and at least one wear sensor. The hook extension extends from one end of the plate member and the pair of wear sensors extend from an opposing end thereof. A hook pocket is formed in an end of the wear pad to receive the hook extension. At least two retention clearance holes are formed through the plate member. The adjustable wear pad is retained on a stationary structure and the wear pad is in contact with a moving structure.

18 Claims, 3 Drawing Sheets

ADJUSTABLE WEAR PAD

BACKGROUND OF THE INVENTION

1. Field of the Invention

The present invention relates generally to heavy equipment and more specifically to an adjustable wear pad with a wear indicator, which eliminates the need for shims to compensate for erosion of a wear pad.

2. Discussion of the Prior Art

The general concept of a wear pad comes into play when two components move in opposition directions to each other. There is a softer, consumable material retained between the two components, which will take the load and keep the components within operational specification. As this process is repeated numerous times, the softer consumable material is reduced in thickness, which increases the operational clearance. Too much clearance between the two components can have an adverse impact on the function of the components. Thus it is recommended to reduce the gap, between the two components, after the wear pad is eroded. The gap can be reduced by adding shims or jacking out the wear pad to reduce the gap between the components.

The designs that make the adjustment through jacking out the wear pad, typically have a number of bolts that are used to push out the wear pad in a number a locations. The concept is to provide a uniform load on the wear pad when it is in operation to ensure it will wear in a uniform manner. Bolts also need to be designed to take axial and shear loads during operation. To ensure a distributed load across the bolts, one needs to ensure each bolt is tightened accurately. U.S. Pat. No. 9,950,911 to Fortunato et al. discloses an adjustable wear pad assembly for a telescopic boom. However, applicants' invention applies force to a single push plate, instead of two push plates.

Accordingly, there is a clearly felt need in the art for an adjustable wear pad with a wear indicator, which eliminates the need for shims to compensate for the erosion of a wear pad and provides auditory and visual indication that the wear pad needs to be replaced.

SUMMARY OF THE INVENTION

The present invention provides an adjustable wear pad with a wear indicator, which provides auditory and visual indication that the wear pad needs to be replaced. The adjustable wear pad with a wear indicator (adjustable wear pad) preferably includes a wear pad, a push plate, at least two pushing fasteners, at least two retention fasteners and at least two threaded inserts. The wear pad preferably includes a plate slot, which is sized to receive an outer perimeter of the push plate. At least two push clearance holes are formed through the wear pad to provide clearance for ends of the at least two pushing fasteners. At least two counter sunk holes are formed in the wear pad for retaining the at least two threaded inserts. Each threaded insert threadably receives one of the retention fasteners. The push plate preferably includes a plate member, a hook extension and at least one wear sensor. The hook extension extends from one end of the plate member and the at least one wear sensor extends from an opposing end thereof. A hook pocket is formed in one end of the wear pad to receive the hook extension. The at least one wear sensor extends downward from the plate member. A distance between a bottom of the at least one wear sensor and a bottom of the wear pad corresponds to a wear thickness of the wear pad.

At least two push clearance holes are preferably formed in the plate member and at least two retention clearance holes are formed through the plate member. The at least two push fasteners are preferably dog point set screws, but other types of fasteners may also be used. The at least two retention fasteners are preferably any suitable threaded bolt with a head. The adjustable wear pad is retained on a stationary structure and a wear surface of the wear pad is in contact with a moving structure. The adjustable wear pad is preferably installed in the following manner. At least two threaded holes and at least two clearance holes are formed through the stationary structure. The push plate is placed in the plate slot. The push plate and wear pad are placed between the stationary structure and the moving structure. A wear surface of the wear pad is placed in contact with the moving structure. The at least two push fasteners are threaded into the at least two threaded holes. The at least two retention fasteners are tightened in the at least two threaded inserts to retain the adjustable wear pad against the stationary structure.

The stationary structure could be an outer tube of a telescoping crane boom and the moving structure could be the inner tube of the telescoping crane boom. To compensate for erosion of the wear pad, the at least two fasteners are loosened and the at least two push fasteners are snugged against the push plate, until the wear pad is in contact with the moving structure. The at least two fasteners are tightened to secure the adjustable wear pad against the stationary structure. The at least one wear sensor on the push plate will make contact with the moving structure and make an audible noise to indicate that the wear pad can no longer be adjusted. The audible noise is notice to an operator that the wear pad must be replaced. The at least one wear sensor will also provide a visual indication of wear.

Accordingly, it is an object of the present invention to provide an adjustable wear pad, which eliminates the need for shims to compensate for the erosion of a wear pad and provides auditory indication that the wear pad needs to be replaced.

These and additional objects, advantages, features and benefits of the present invention will become apparent from the following specification.

DETAILED DESCRIPTION OF THE PREFERRED EMBODIMENTS

Figure 1:
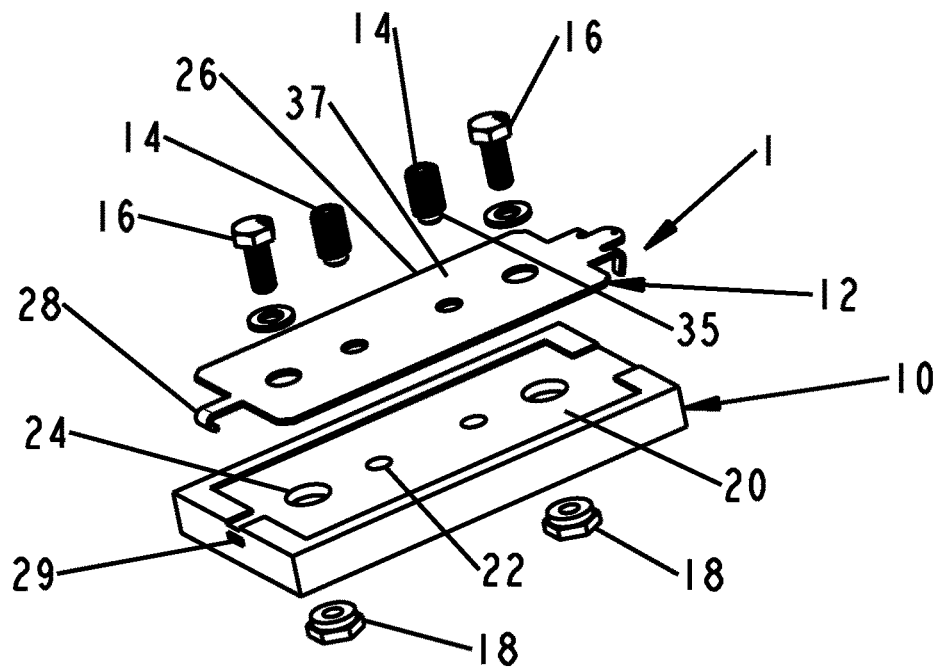
FIG. 1 is a top left side exploded perspective view of an adjustable wear pad in accordance with the present invention.
Figure 2:
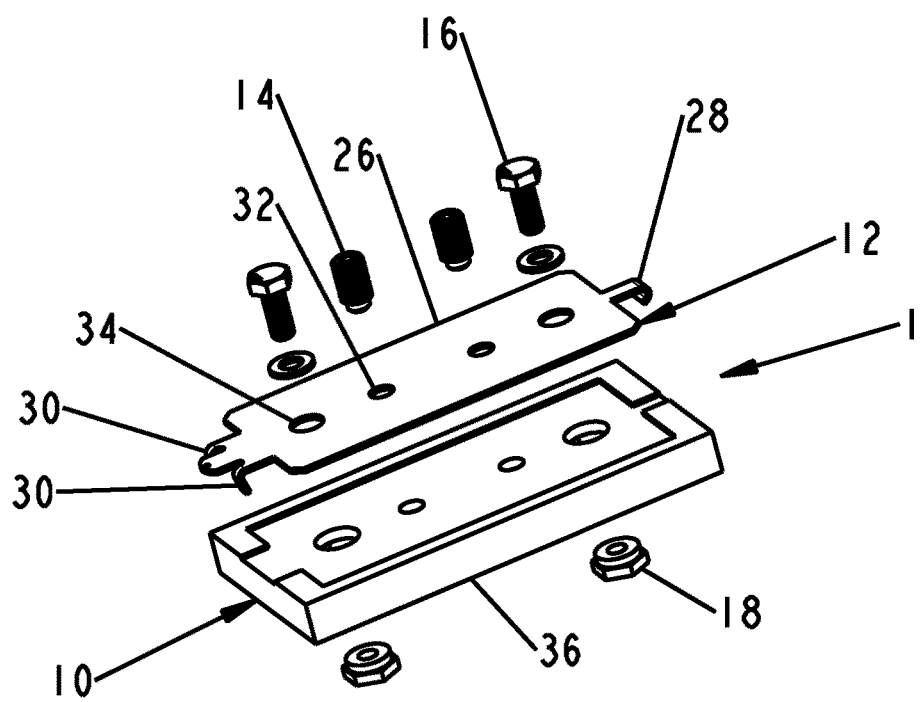
FIG. 2 is a top right side exploded perspective view of an adjustable wear pad in accordance with the present invention.
Figure 3:
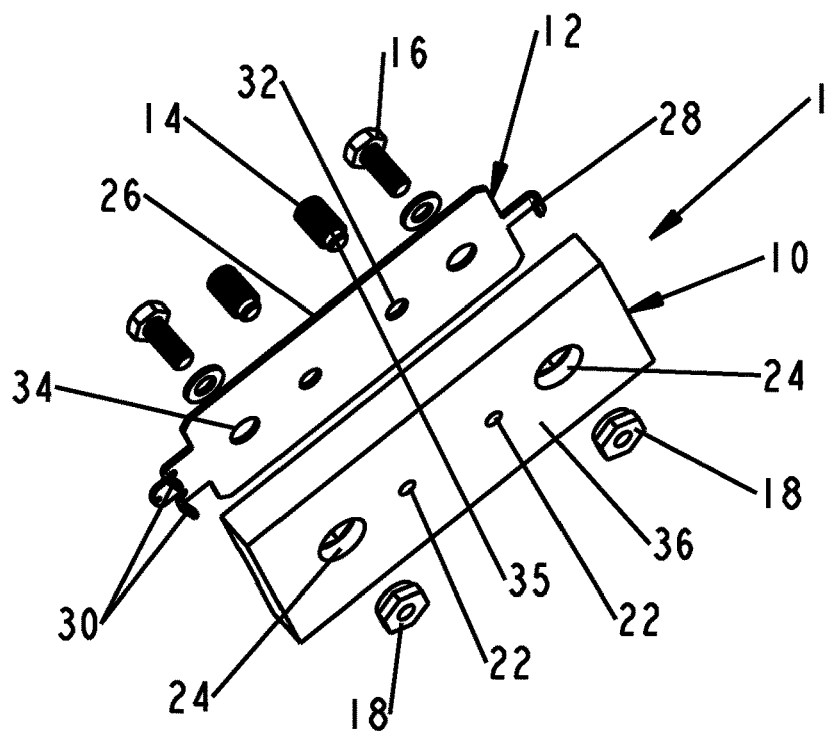
FIG. 3 is a bottom right side exploded perspective view of an adjustable wear pad in accordance with the present invention.

With reference now to the drawings, and particularly to FIG. 1, there is shown a top left exploded perspective view of an adjustable wear pad 1. With reference to FIGS. 2-3, the adjustable wear pad 1 preferably includes a wear pad 10, a push plate 12, at least two pushing fasteners 14, at least two retention fasteners 16 and at least two threaded inserts 18. The wear pad 10 preferably includes a plate slot 20, which is sized to receive an outer perimeter of the push plate 12. At least two push clearance holes 22 are preferably formed through the wear pad 10 to provide clearance for ends of the at least two pushing fasteners 14. At least two counter sunk holes 24 are preferably formed in the wear pad 10 for retaining the at least two threaded inserts 18. Each threaded insert 18 threadably receives one of the retention fasteners 16. The push plate 12 preferably includes a plate member 26, a hook extension 28 and at least one wear sensor 30. The hook extension 28 extends from one end of the plate member 26 and the at least one sensor 30 extends from an opposing end thereof. A hook pocket 29 is formed in one end of the wear pad 10 to receive the hook extension 28. The at least one wear sensor 30 extends downward from the plate member 26. A distance between a bottom of the at least one wear sensor 30 and a bottom of the wear pad 10 corresponds to a wear thickness of the wear pad 10. The at least one wear sensor 30 will also not allow the at least two threaded inserts to contact a moving structure.

At least two push clearance holes 32 are formed in the plate member 26 and at least two retention clearance holes 34 are formed through the plate member 26. The at least two push fasteners 14 are preferably dog point set screws, but other types of fasteners may also be used. Each push fastener 14 includes a pressure shoulder 35, which makes contact with a top surface 37 of the push plate 12. The at least two retention fasteners 14 are preferably any suitable threaded bolt with a head. The adjustable wear pad 10 is preferably retained relative to a stationary structure 100 and a wear surface 36 of the wear pad 10 is in contact with a moving structure 102. However, the adjustable wear pad 1 could be retained by the moving structure 102. The adjustable wear pad 1 would be secured to the moving structure 102.

Figure 4:
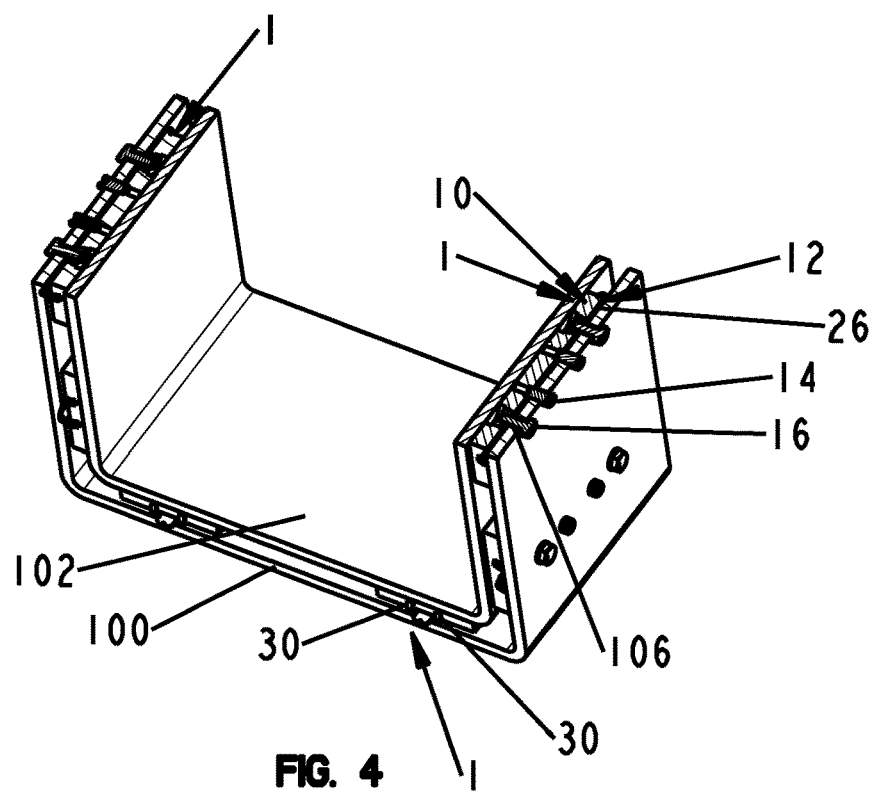
FIG. 4 is a perspective cross sectional view cut through a middle of two adjustable wear pads mounted between a stationary structure and a moving structure in accordance with the present invention.
Figure 5:
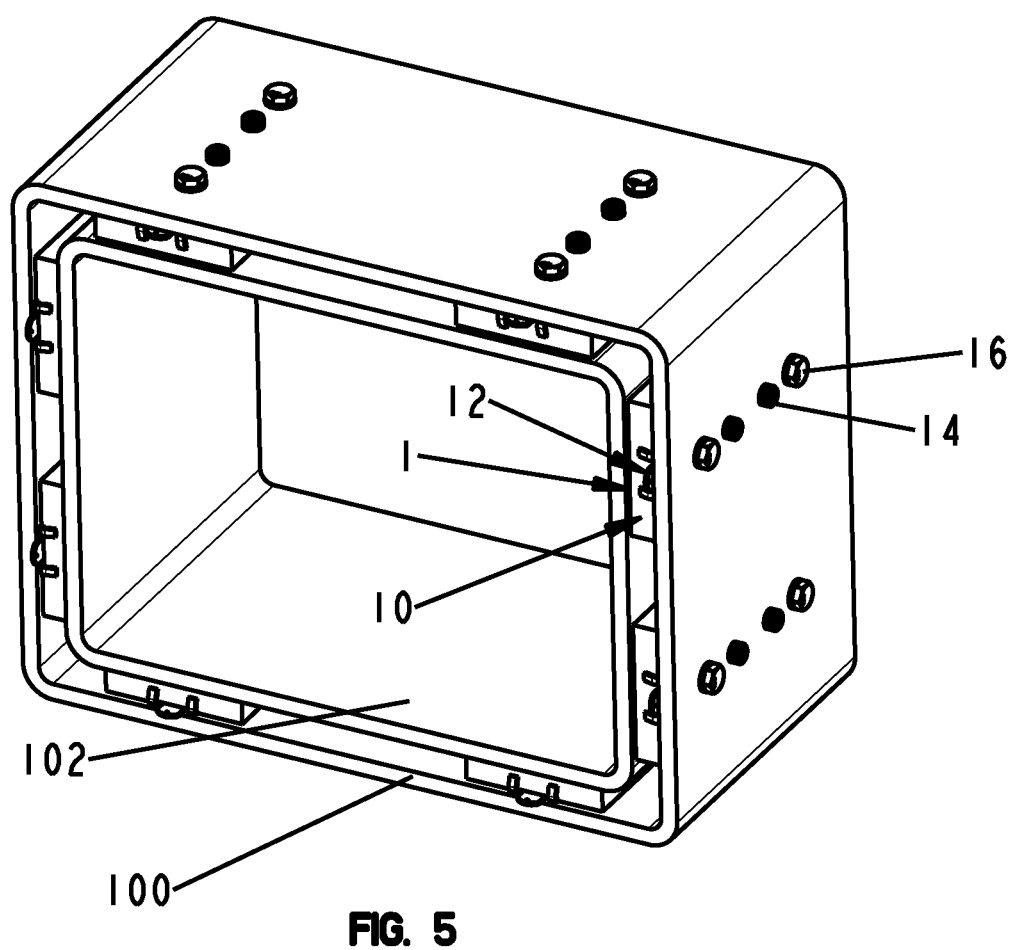
FIG. 5 is a perspective end view of eight adjustable wear pads mounted between a stationary structure and a moving structure in accordance with the present invention.

The adjustable wear pad 1 is preferably installed in the following manner. At least two threaded holes 104 and at least two clearance holes 106 are formed through the stationary structure 100. With reference to FIGS. 4-5, the push plate 12 is placed in the pad slot 20. The push plate 12 and the wear pad 10 are placed between the stationary structure 100 and the moving structure 102. The wear surface 36 of the wear pad 10 is placed in contact with the moving structure 102. The at least two push fasteners 14 are threaded into the at least two threaded holes 104. The at least two retention fasteners 16 are inserted through the at least two clearance holes 106 and tightened in the at least two threaded inserts 18 to retain the adjustable wear pad 1 against the stationary structure 100. The push plate 12 will not bow, such that the push plate 12 applies even pressure to the wear pad 10 through the at least two push fasteners 14.

The stationary structure 100 could be an outer tube of a telescoping crane boom and the moving structure 102 could be the inner tube of the telescoping crane boom. However, the stationary structure 100 and the moving structure 102 could be any appropriate structures. To compensate for erosion of the wear pad 10, the at least two fasteners 16 are loosened and the at least two push fasteners 14 are snugged against the push plate 12, until the wear pad 10 is in contact with the moving structure 102. The at least two fasteners 16 are tightened to secure the adjustable wear pad 1 against the stationary structure 100. The at least one wear sensor 30 on the push plate 12 will make contact with the moving structure 102 and make an audible noise, when the wear pad 10 can no longer be adjusted. The audible noise is notice to an operator that the wear pad 10 must be replaced. The at least one wear sensor will also provide a visual indication of wear.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A bearing assembly comprising a stationary structure, a moving structure and an adjustable wear pad, said adjustable wear pad, comprising:
   a wear pad;
   at least two threaded inserts are retained in said wear pad;
   a push plate;
   at least two pushing fasteners are threadably engaged with the stationary structure, said at least two pushing fasteners contact said push plate; and
   at least two retention fasteners are inserted through at least two clearance holes formed through the stationary structure, wherein said at least two retention fasteners threadably engage said at least two threaded inserts to retain said adjustable wear pad relative to said stationary structure, said wear pad contacts the moving structure.

2. The adjustable wear pad of claim 1 wherein:
   a hook extension extends from one end of said push plate, a hook pocket is formed in one end of said wear plate to receive said hook extension.

3. The adjustable wear pad of claim 1 wherein:
   at least two clearance holes are formed through said push plate to provide clearance for said at least two retention fasteners.

4. The adjustable wear pad of claim 1 wherein:
   said at least two push fasteners are dog point set screws.

5. The adjustable wear pad of claim 1 wherein:
   at least two push holes are formed through said push plate to provide clearance for a portion of said at least two pushing fasteners.

6. The adjustable wear pad of claim 1 wherein:
   said at least two push fasteners are adjustable to ensure that said push plate applies pressure to said wear pad.

7. A bearing assembly comprising a stationary structure, a moving structure and an adjustable wear pad, said adjustable wear pad, comprising:
   a wear pad;
   at least two threaded inserts are retained in said wear pad;
   a push plate which includes at least one wear sensor extending downward from one end thereof;
   at least two pushing fasteners are threadably engaged with the stationary structure, said at least two pushing fasteners contact said push plate; and
   at least two retention fasteners are inserted through at least two clearance holes formed through the stationary structure, wherein said at least two retention fasteners threadably engage said at least two threaded inserts to retain said adjustable wear pad relative to said stationary structure, said wear pad contacts the moving structure.

8. The adjustable wear pad of claim 7 wherein:
   a hook extension extends from an opposing end of said push plate, a hook pocket is formed in one end of said wear plate to receive said hook extension.

9. The adjustable wear pad of claim 7 wherein:
at least two clearance holes are formed through said push plate to provide clearance for said at least two retention fasteners.

10. The adjustable wear pad of claim 7 wherein:
said at least two push fasteners are dog point set screws.

11. The adjustable wear pad of claim 7 wherein:
at least two push holes are formed through said push plate to provide clearance for a portion of said at least two pushing fasteners.

12. The adjustable wear pad of claim 7 wherein:
a bottom of said at least two threaded inserts are located above a bottom of said at least wear sensor.

13. The adjustable wear pad of claim 12 wherein:
said at least two push fasteners are adjustable to ensure that said push plate applies pressure to said wear pad.

14. A bearing assembly comprising a stationary structure, a moving structure and an adjustable wear pad, said adjustable wear pad, comprising:
- a wear pad;
- at least two threaded inserts are retained in said wear pad;
- a push plate being sized to be received by a plate slot formed in a top of said wear pad;
- at least two pushing fasteners are threadably engaged with the stationary structure, said at least two pushing fasteners contact said push plate; and
- at least two retention fasteners are inserted through at least two clearance holes formed through the stationary structure, wherein said at least two retention fasteners threadably engage said at least two threaded inserts to retain said adjustable wear pad relative to said stationary structure, said wear pad contacts the moving structure.

15. The adjustable wear pad of claim 14 wherein:
a hook extension extends from one end of said push plate, a hook pocket is formed in one end of said wear plate to receive said hook extension.

16. The adjustable wear pad of claim 14 wherein:
at least two clearance holes are formed through said push plate to provide clearance for said at least two retention fasteners.

17. The adjustable wear pad of claim 14 wherein:
said at least two push fasteners are dog point set screws.

18. The adjustable wear pad of claim 14 wherein:
at least two push holes are formed through said push plate to provide clearance for a portion of said at least two pushing fasteners.

\* \* \* \* \*